United States Patent
Kim

(10) Patent No.: US 12,439,310 B2
(45) Date of Patent: Oct. 7, 2025

(54) METHOD AND APPARATUS FOR LAYER3 MEASUREMENT IN MOBILE WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(*) Notice: Subject to any disclaimer, the term of this patent is extended or adjusted under 35 U.S.C. 154(b) by 0 days.

(21) Appl. No.: 18/901,029

(22) Filed: Sep. 30, 2024

(65) Prior Publication Data
US 2025/0126533 A1    Apr. 17, 2025

(30) Foreign Application Priority Data
Oct. 17, 2023    (KR) .......................... 1020230138320

(51) Int. Cl.
*H04W 36/00* (2009.01)
(52) U.S. Cl.
CPC . *H04W 36/0094* (2013.01); *H04W 36/00835* (2018.08)
(58) Field of Classification Search
CPC ............. H04W 24/10; H04W 36/0058; H04W 36/0061; H04W 36/0083; H04W 36/00835; H04W 36/008355; H04W 36/0085; H04W 36/0088; H04W 36/0094; H04W 36/24; H04W 36/30; H04W 36/302; H04W 36/304; H04W 72/50; H04W 72/54; H04W 72/542
See application file for complete search history.

(56) References Cited

U.S. PATENT DOCUMENTS

| | | | | |
|---|---|---|---|---|
| 2013/0023302 A1* | 1/2013 | Sivanesan | ........... | H04W 36/324 455/525 |
| 2016/0323809 A1* | 11/2016 | Zhang | ............. | H04W 36/00835 |
| 2022/0116844 A1* | 4/2022 | Qiao | ..................... | H04W 48/20 |
| 2023/0180083 A1* | 6/2023 | Shi | ................. | H04W 36/00838 370/331 |

OTHER PUBLICATIONS

3GPP, 3rd Generation Partnership Project; Technical Specification Group Radio Access Network; NR; Radio Resource Control (RRC) protocol specification (Release 17), Sep. 2023, pp. 1-1337, 3GPP TS 38.331 V17.6.0, http://www.3gpp.org.
3GPP,"TSG-RAN WG2 Meeting #123, R2-2310280", Xiamen, China, Oct. 9-13, 2023, pp. 1-27.
3GPP,"TSG-RAN WG2 Meeting #123bis, R2-2310095", Xiamen, China, Oct. 9-13, 2023, pp. 1-3.
3GPP,TSG-RAN WG2 Meeting #123bis, R2-2310281, Xiamen, China, Oct. 9-13, 2023, pp. 1-12.
3GPP,"TSG-RAN WG2 Meeting #123bis, R2-2310527", Xiamen, China, Oct. 9-13, 2023, pp. 1-6.
3GPP,"TSG-RAN WG2 Meeting #123bis, R2-2310688", Xiamen, China, Oct. 9-13, 2023, pp. 1-5.

(Continued)

*Primary Examiner* — Matthew W Genack
(74) *Attorney, Agent, or Firm* — Kevin P. Radigan, Esq.; Heslin Rothenberg Farley & Mesiti P.C.

(57) ABSTRACT

A method for enhancing mobility performance in network where cells with varying radio capabilities and sensitivities are deployed. The method enables providing Cell Individual Offset (CIO) values for neighbor cells in efficient and flexible way so that mobility performance is enhanced with minimum overhead both in signaling and processing.

7 Claims, 7 Drawing Sheets

(56) References Cited

OTHER PUBLICATIONS

3GPP,"TSG-RAN WG2 #123-bis, R2-2311221", Xiamen, China, Oct. 9-13, 2023, pp. 1-3.
3GPP,"TSG-RAN WG2 Meeting #123bis, R2-2311230", Xiamen, China, Oct. 9-13, 2023, pp. 1-1315.
3GPP,"TSG-RAN WG2 Meeting #124, R2-2311701", Xiamen, China, Oct. 9-13, 2023, pp. 1-352.

* cited by examiner

METHOD AND APPARATUS FOR LAYER3 MEASUREMENT IN MOBILE WIRELESS COMMUNICATION SYSTEM

CROSS-REFERENCE TO RELATED APPLICATION

This application claims priority to and the benefit of Korean Patent Application No. 10-2023-0138320, filed on Oct. 17, 2023, the disclosure of which is hereby incorporated herein by reference in its entirety.

BACKGROUND

Technical Field

The present disclosure relates to layer 3 measurement in wireless mobile communication system. More specifically, the present disclosure relates to enhance mobility performance in various cell deployments.

Related Art

To meet the increasing demand for wireless data traffic since the commercialization of 4th generation (4G communication systems), the 5th generation (5G system) is being developed. 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency. Various verticals such as IoT and smart device with reduced capability are deployed in the 5G mobile communication system.

Layer 3 measurements play a crucial role in the efficient operation and management of NR networks. These measurements provide essential information for various network functions, including handover decisions, cell reselection, and radio resource management. Accurate and timely Layer 3 measurements are vital for maintaining the quality of service (QoS) and ensuring seamless connectivity for users.

The present invention addresses the need for improved methods and apparatuses for performing Layer 3 measurements in NR systems. By leveraging advanced signal processing techniques and innovative measurement algorithms, the invention aims to enhance the accuracy, reliability, and efficiency of Layer 3 measurements.

SUMMARY

Aspects of the present disclosure are to enhance layer 3 measurement performance. The method of the terminal includes receiving from a base station a radio resource control (RRC) message wherein the RRC message comprises a measurement object configuration and a measurement report configuration, determining based on a specific CIO to remove a specific cell in a cell list, and initiating measurement reporting procedure in case that a specific indication is comprised in the measurement report configuration and the specific indication is set to a specific value. The specific CIO is determined based on the second information in case that the specific cell is indicated both in the first information and in the second information. The specific CIO is determined based on the first information in case that the specific cell is not indicated in the second information and the specific cell is indicated in the first information.

DETAILED DESCRIPTION

Figure 1:
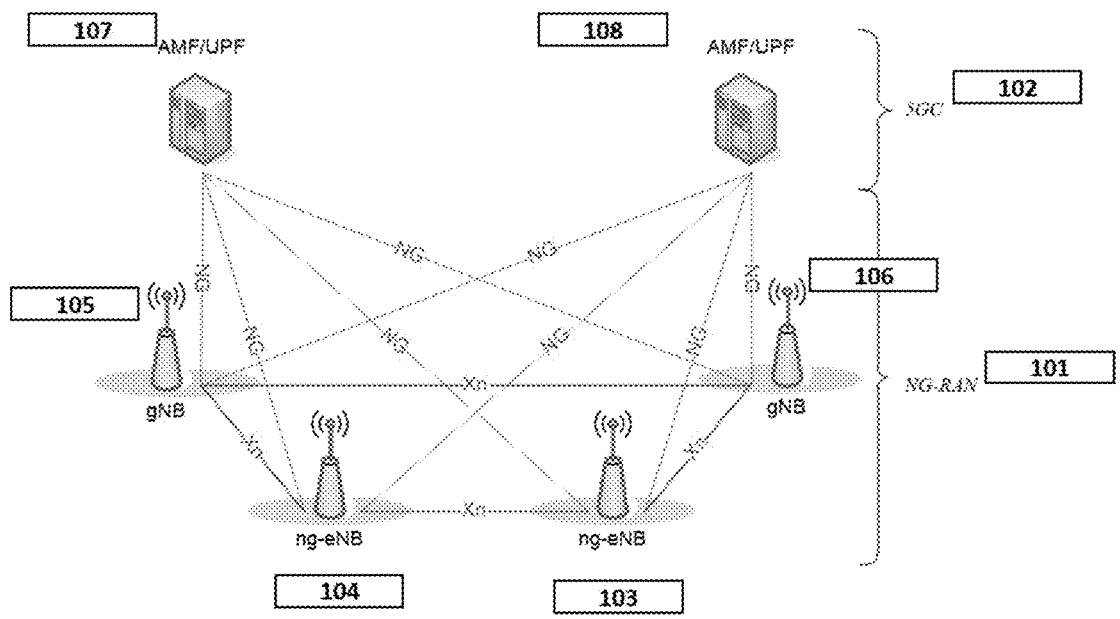
FIG. 1 is a diagram illustrating the architecture of an 5G system and a NG-RAN to which the disclosure may be applied.

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the present disclosure, followings are used interchangeably:

Terminal and UE and wireless device;
Information Element (IE) and set of parameters;
Parameter and field and IE;
Base station and GNB;
report configuration and measurement report configuration and ReportConfigNR and ReportConfig;
measurement object configuration and measObjectNR and measObject;
measurement identity configuration and measIdToAddMod; and
cell specific offset and cell individual offset and cellIndividualOffset and CIO;
PCI and physical cell identity and PhysCellId. Layer 3 measurements are a critical component in the operation and management of New Radio (NR) systems, which form the backbone of 5G technology. These measurements provide essential data for various network functions, including handover decisions, cell reselection, and radio resource management. Accurate and timely Layer 3 measurements are vital for maintaining the quality of service (QoS) and ensuring seamless connectivity for users.

Layer 3 measurements in NR systems encompass a variety of metrics, including but not limited to:
> Signal Strength: Measurements such as Reference Signal Received Power (RSRP) and Reference Signal Received Quality (RSRQ) provide insights into the signal strength and quality experienced by the user equipment (UE).
> Interference Levels: Metrics like Signal-to-Interference-plus-Noise Ratio (SINR) help in assessing the level of interference in the network, which is crucial for optimizing resource allocation.
> Timing Measurements: These include measurements like Round Trip Time (RTT) and Timing Advance (TA), which are essential for synchronization and handover processes.

The network configures the measurement parameters and communicates them to the UE through signaling messages. These parameters include the measurement objects, reporting criteria, and measurement intervals. The UE uses this configuration to perform the required measurements and report the results back to the network.

The UE reports the measurement results to the network based on predefined criteria. These criteria can be event-triggered or periodic. Event-triggered reporting occurs when certain conditions are met, such as a drop in signal strength below a threshold.

In New Radio (NR) systems, the measurement configuration process involves setting up parameters and procedures for measuring various radio-related quantities, such as signal strength, quality, and interference. This configuration includes three main components: Measurement Identity (measId), Measurement Object (measObject), and Report Configuration (reportConfig).

Measurement Identity (measId) is a unique identifier associated with a specific measurement configuration. It is used to link measurement configurations with measurement instances and reports. Multiple Measurement Identities can be configured simultaneously, allowing different measurement configurations to coexist. This is particularly useful in scenarios where the User Equipment (UE) needs to measure multiple cells or frequencies.

Measurement Object (measObject) defines what is being measured. It includes parameters such as the frequency or frequency range, cell identity, and physical cell identity. These parameters determine the scope and context of the measurement. In NR systems, measurements can be made on intra-frequency, inter-frequency, or intra-system (intra-RAT) cells. The Measurement Object also includes configuration parameters like the bandwidth and subcarrier spacing.

Report Configuration (reportConfig) defines how and when the measurement results should be reported. It includes parameters such as reporting mode, reporting interval, and reporting quantity. Reporting modes can be event-triggered or periodic. Event-triggered reporting occurs when a certain condition is met (e.g., a threshold is crossed), while periodic reporting involves regular, scheduled reports. Reporting intervals determine how often the measurement reports are sent, and reporting quantities specify the type of information to be included in the reports (e.g., RSRP, RSRQ, SINR). Following events are defined:

Event A1: Serving becomes better than absolute threshold;
Event A2: Serving becomes worse than absolute threshold;
Event A3: Neighbour becomes amount of offset better than PCell/PSCell;
Event A4: Neighbour becomes better than absolute threshold;
Event A5: PCell/PSCell becomes worse than absolute threshold1 AND Neighbour/SCell becomes better than another absolute threshold2;
Event A6: Neighbour becomes amount of offset better than SCell;

The relationship between measId, measObject, and reportConfig is fundamental to the measurement configuration process in NR systems:
> measId: Acts as a unique identifier that links a specific measurement configuration to the measurement instances and reports. It ensures that the UE associates the correct measurement results with the corresponding configuration when sending reports to the network.
> measObject: Defines the parameters of what is being measured, such as frequency, cell identity, and bandwidth. It provides the context for the measurements that the UE needs to perform.
> reportConfig: Specifies how and when the measurement results should be reported, including the reporting mode, interval, and quantity. It ensures that the measurement results are communicated to the network in a timely and efficient manner.

Cell Individual Offset (CIO) is a parameter used in cellular networks to adjust the reference signal power level for each cell. This adjustment helps improve the reliability of the handover process by ensuring that mobile devices connect to the most appropriate cell tower. CIO is particularly important in NR systems, where maintaining seamless connectivity and optimal network performance is crucial.

CIO is a value that can range from −15 to +15 dB, with the default value being 0 dB. A negative CIO value indicates that the cell tower is closer to the mobile device than the reference signal power level suggests, while a positive value indicates that the cell tower is further away 1. By adjusting the reference signal power level, CIO helps mobile devices identify and connect to the nearest and most suitable cell tower.

When deploying cells with different radio capabilities and sensitivities, various cell individual cell offset values per neighbor cell would be essential. CIO for a cell is provided in the measurement object configuration associated with the cell. This imposes a restriction that only one CIO per cell is signaled. Due to signaling structure of measurement object configuration (i.e. only one measurement object configuration per frequency is allowed), it is not possible to remove such restriction in the current signaling structure. One way to improve the situation is to indicate CIO in other IE such as report configuration. To enable such improvement, following two issues should be resolved.
>: Unlike measurement object configuration, report configuration is frequency-agnostic. It means that frequency related information is required to indicate which frequency the CIO is applied to;
>: Two different CIOs can be available for a neighbor cell in case that the CIO is provided both in the associated measurement object configuration and associated report configuration. An algorithm to handle this case is required.

In the present disclosure, CIO for a neighbor cell can be provided in the measurement object configuration and in the measurement report configuration. UE and the base station determine which CIO is applied based on the concerned measurement identity and presence of CIO for the neighbor cell in which configuration.

FIG. 1 is a diagram illustrating the architecture of an 5G system and a NG-RAN to which the disclosure may be applied.

5G system consists of NG-RAN 101 and 5GC 102. An NG-RAN node is either:
- >1: a gNB, providing NR user plane and control plane protocol terminations towards the UE; or
- >1: an ng-eNB, providing E-UTRA user plane and control plane protocol terminations towards the UE.

The gNBs 105 or 106 and ng-eNBs 103 or 104 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 107 and UPF 108 may be realized as a physical node or as separate physical nodes.

A gNB 105 or 106 or an ng-eNBs 103 or 104 hosts the various functions listed below.
- >1: Functions for Radio Resource Management such as Radio Bearer Control, Radio Admission Control, Connection Mobility Control, Dynamic allocation of resources to UEs in uplink, downlink and sidelink (scheduling); and
- >1: IP and Ethernet header compression, uplink data decompression and encryption of user data stream; and
- >1: Selection of an AMF at UE attachment when no routing to an MME can be determined from the information provided by the UE; and
- >1: Routing of User Plane data towards UPF; and
- >1: Scheduling and transmission of paging messages; and
- >1: Scheduling and transmission of broadcast information (originated from the AMF or O&M); and
- >1: Measurement and measurement reporting configuration for mobility and scheduling; and
- >1: Session Management; and
- >1: QoS Flow management and mapping to data radio bearers; and
- >1: Support of UEs in RRC_INACTIVE state; and The AMF 107 hosts the functions such as NAS signaling, NAS signaling security, AS security control, SMF selection, Authentication, Mobility management and positioning management.

The UPF 108 hosts the functions such as packet routing and forwarding, transport level packet marking in the uplink, QoS handling and the downlink, mobility anchoring for mobility etc.

Figure 2:
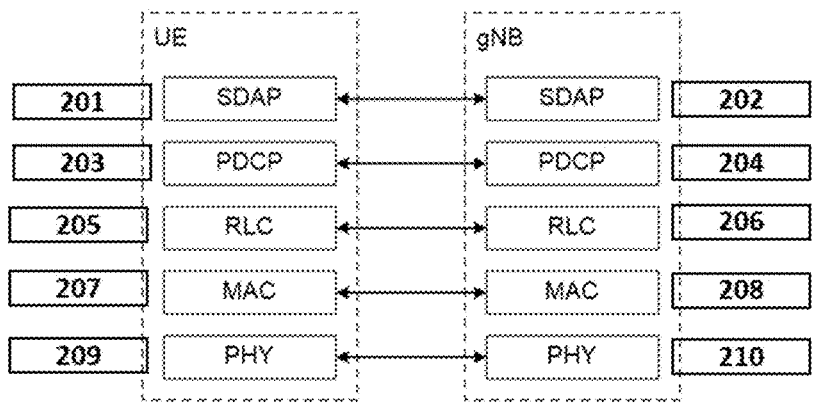
FIG. 2 is a diagram illustrating a wireless protocol architecture in an 5G system to which the disclosure may be applied.
Figure 2:
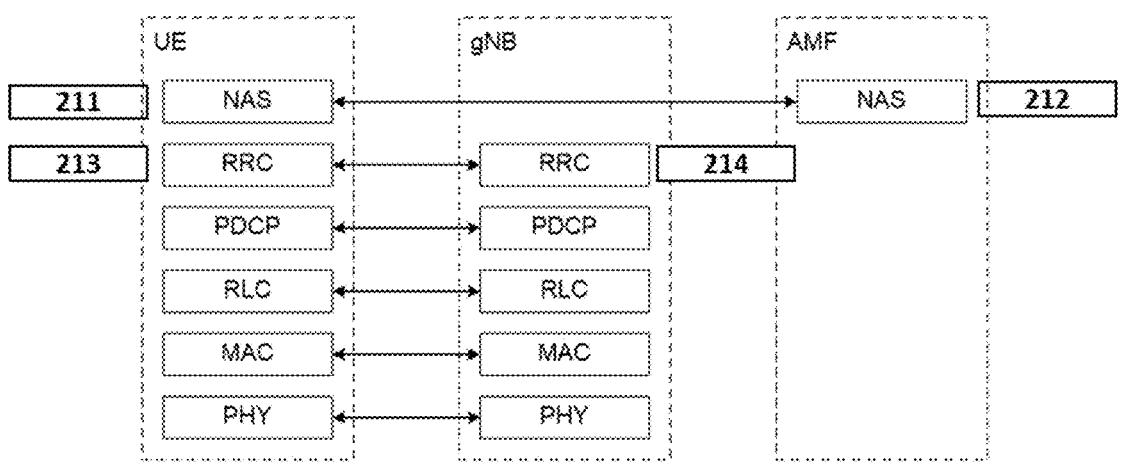

FIG. 2 is a diagram illustrating a wireless protocol architecture in an 5G system to which the disclosure may be applied.

User plane protocol stack consists of SDAP 201 or 202, PDCP 203 or 204, RLC 205 or 206, MAC 207 or 208 and PHY 209 or 210. Control plane protocol stack consists of NAS 211 or 212, RRC 213 or 214, PDCP, RLC, MAC and PHY.

Each protocol sublayer performs functions related to the operations listed below.
- NAS: authentication, mobility management, security control etc
- RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.
- SDAP: Mapping between a QoS flow and a data radio bearer, Marking QoS flow ID (QFI) in both DL and UL packets.
- PDCP: Transfer of data, Header compression and decompression, Ciphering and deciphering, Integrity protection and integrity verification, Duplication, Reordering and in-order delivery, Out-of-order delivery etc.
- RLC: Transfer of upper layer PDUs, Error Correction through ARQ, Segmentation and re-segmentation of RLC SDUs, Reassembly of SDU, RLC re-establishment etc.
- MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.
- PHY: Channel coding, Physical-layer hybrid-ARQ processing, Rate matching, Scrambling, Modulation, Layer mapping, Downlink Control Information, Uplink Control Information etc.

Figure 3A:
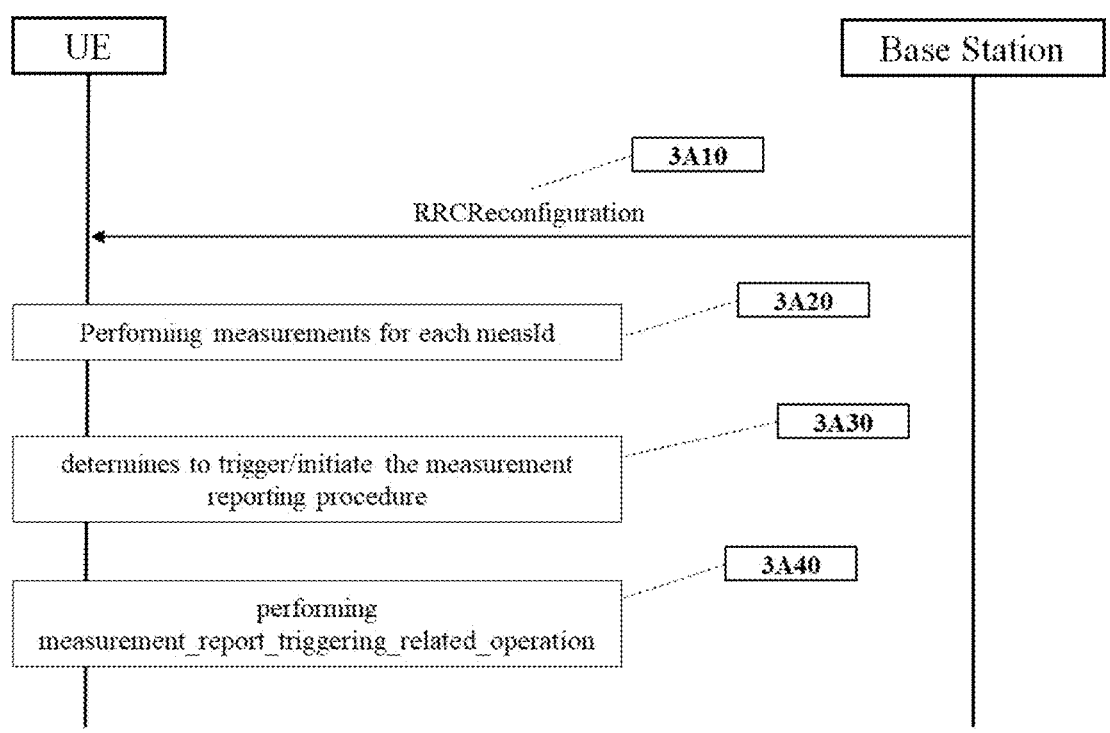
FIG. 3A illustrates the operation of a UE and a base station.

FIG. 3A illustrates operation of UE and base station to perform measurement reporting procedure.

At 3A10, GNB transmits to UE a RRCReconfiguration message. The RRCReconfiguration message comprises a MeasConfig IE. This IE comprises information about the measurement parameters, such as measurement objects, reporting criteria, and measurement gaps. UE generates and maintain VarMeasConfig and VarMeasReportList for a cell group (MCG or for SCG).

At 3A20, UE performs measurements for each measId in the measIdList within varMeasConfig for the cell group. UE measures signal strength, quality, and other relevant metrics for the specified measurement objects.

At 3A30, UE determines, for MCG or for SCG, to trigger/initiate the measurement reporting procedure based on:
- >: CIO configured in MeasObject or CIO configured in ReportConfig;
- >: measured results on the neighboring cells and serving cells; and
- >: measurement report configuration.

In case that a MeasId is associated with a ReportConfig of which reportType is set to eventTriggered:
- >1: for a MeasId in the measIdList within varMeasConfig of the cell group; and
- >1: for a neighbor cell in the carrier frequency of MO (associated a measObjectId) and indicated by a PCI;
  - >>>2: if cellIndividualOffset is configured in the associated MeasObject and is configured in the associated ReportConfig; or
  - >>>2: if cellIndividualOffset is not configured in the associated MeasObject and is configured in the associated ReportConfig;
    - >>>>3: UE determines, based on cellIndividualOffset in the associated ReportConfig, whether to perform measurement_report_triggering_related_operation for the neighbor cell or not;
  - >>>2: if cellIndividualOffset is configured in the associated MeasObject and is not configured in the associated ReportConfig;

>>>>3: UE determines, based on cellIndividualOffset in the associated MeasObject, whether to perform measurement_report_triggering_related_operation for the neighbor cell or not;
>>>2: if cellIndividualOffset is not configured in the associated MeasObject and is not configured in the associated ReportConfig;
>>>>3: UE determines, without considering cellIndividualOffset, whether to perform measurement_report_triggering_related_operation for the neighbor cell or not;

In case that a MeasId is associated with a ReportConfig of which reportType is set to condTriggerConfig:
>1: UE performs conditional reconfiguration evaluation;
>1: UE determines, for MCG or for SCG, to perform conditional_reconfiugration_evaluation_operation for a cell based on CIO configured in MeasObject or on CIO configured in ReportConfig;
>1: for a MeasId in the measIdList within varMeasConfig of the cell group; and
>1: for a neighbor cell in the carrier frequency of MO (associated a measObjectId) and indicated by a PCI;
>>>3: if cellIndividualOffset is configured in the associated MeasObject and is configured in the associated ReportConfig; or
>>>3: if cellIndividualOffset is not configured in the associated MeasObject and is configured in the associated ReportConfig;
>>>>3: UE determines, based on cellIndividualOffset in the associated ReportConfig, whether to perform conditional_reconfiugration_evalution_operation for the neighbor cell or not;
>>>3: if cellIndividualOffset is configured in the associated MeasObject and is not configured in the associated ReportConfig;
>>>>3: UE determines, based on cellIndividualOffset in the associated MeasObject, whether to perform conditional_reconfiugration_evaluation_operation for the neighbor cell or not;
>>>3: if cellIndividualOffset is not configured in the associated MeasObject and is not configured in the associated ReportConfig;
>>>>3: UE determines, without considering cellIndividualOffset, whether to perform conditional_reconfiugration_evalution_operation for the neighbor cell or not;

At 3A40, UE performs measurement_report_triggering_related_operation. UE performs followings:
>1: if measurement_report_triggering_related_operation is determined to be performed for a cell, UE may:
>1: if the entry condition applicable for this event, i.e. the event corresponding with the eventId of the corresponding reportConfig within VarMeasConfig, is fulfilled for the cell;
>>>3: include the cell in the cellsTriggeredList;
>>>3: initiate the measurement reporting procedure;
>1: if the cell is included in the cellsTriggeredList defined within the VarMeasReportList for this measId; and
>1: if the leaving condition applicable for this event is fulfilled for the cell;
>>>3: remove the concerned cell(s) in the cellsTriggeredList defined within the VarMeasReportList for this measId;
>>>3: if reportOnLeave is set to true for the corresponding reporting configuration:
>>>>3: initiate the measurement reporting procedure.
>1: if conditional_reconfiugration_evalution_operation is determined to be performed for a cell, UE may:
>1: consider the cell as triggered cell (target candidate cell);
>1: apply the condRRCReconfig associated with the cell for conditional reconfiguration execution.

If MeasConfig is included within MRDC-SecondaryCellGroupConfig or within nr-SecondaryCellGroupConfig, UE and GNB performs the operation for SCG VarMeasConfig and SCG VarMeasReportList.

If MeasConfig is included within RRCReconfiguration-IEs, UE and GNB performs the operation for MCG VarMeasConfig and MCG VarMeasReportList.

In case that measurement reporting procedure is initiated, UE generates MeasReport message that comprises serving cell measurement results and neighboring cell measurement results. UE transmits the MeasReport message to the base station.

Figure 3B:
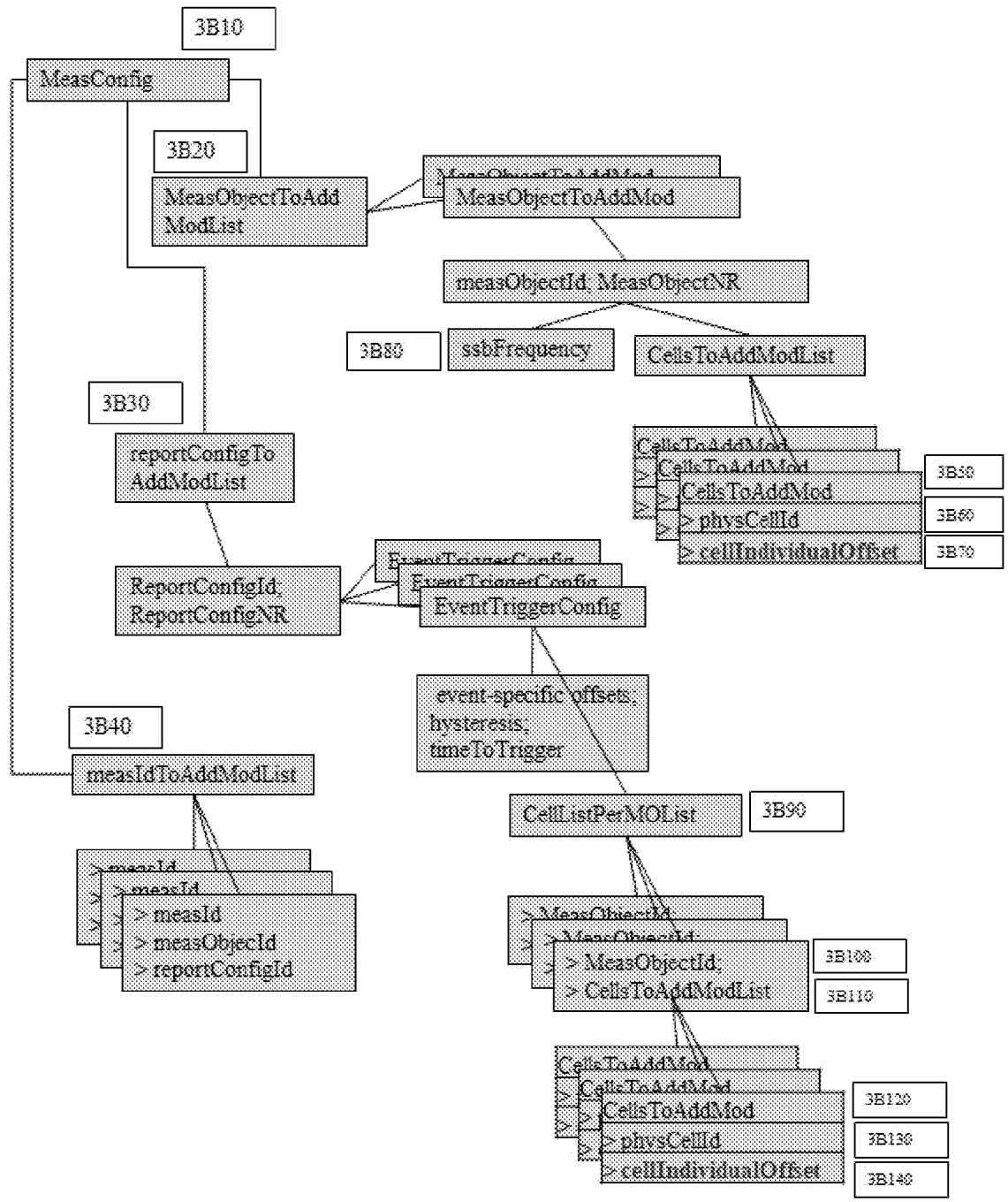
FIG. 3B illustrates measurement configuration.

FIG. 3B illustrates measurement configuration information. Each rectangular in FIG. 3B is a IE or a field.

The MeasConfig IE 3B10 comprises following IEs/fields:
>: measObjectToAddModList 3B20 which comprises MeasObjectToAddModList;
>: reportConfigToAddModList 3B30 which comprises ReportConfigToAddModList; and
>: measIdToAddModList 3B40 which comprises MeasIdToAddModList.

MeasIdToAddModList contains one or more MeasIdToAddMod. A MeasIdToAddMod IE comprises:
>: measId field;
>: measObjectId field that indicates measurement object associated with the measurement identity; and
>: reportConfigId field that indicates report configuration associated with the measurement identity.

MeasObjectToAddModList comprises one or more MeasObjectToAddMod. A MeasObjectToAddMod comprises a measObjectId and MeasObjectNR. A MeasObjectNR comprises:
>: cellsToAddModList field that indicates a list of cells to add/modify in the cell list. This field comprises one or more CellsToAddMod IEs 3B50. Each CellsToAddMod IE comprises:
>>: physCellId field 3B60 that comprises PhysCellId IE; and
>>: cellIndividualOffset field 3B70 that comprises Q-OffsetRangeList;
>: ssbFrequency field 3B80 that comprises ARFCN-ValueNR IE:
>> this field indicates the frequency of the Synchronization signal (SS) or SSB associated to this MeasObjectNR;
>: freqBandIndicatorNR that indicates the frequency band in which the SSB and/or CSI-RS indicated in this MeasObjectNR are located and according to which the UE shall perform the RRM measurements.
>: offsetMO field that indicates offset values applicable to all measured cells with reference signal(s) indicated in this MeasObjectNR.

RepoortConfigToAddModList 3B30 comprises one or more ReportConfigToAddMod IEs. A ReportConfigToAddMod IE comprises ReportConfigId and ReportConfigNR. A ReportConfigNR comprises a reportType field that indicates type of configured measurement report. If the ReportConfigNR is to configure event-triggered report, the report- Type field comprises an eventTriggered field. The event-Triggered field comprises following fields;
>: event specific parameters:
>>: a3-Offset/a6-Offset field that indicates offset value(s) to be used in NR measurement report triggering condition for event a3/a6. The actual value is field value*0.5 dB;
>>: aN-ThresholdM field that indicates threshold value associated to the selected trigger quantity to be used in NR measurement report triggering condition for the concerned event.
>>: reportOnLeave field that indicates whether or not the UE shall initiate the measurement reporting procedure when the leaving condition is met for a cell in cellsTriggeredList;
>>: timeToTrigger field that indicates time during which specific criteria for the event needs to be met in order to trigger a measurement report;
>: CelllListPerMOList field that provide additional cellIndividualOffsets. This field comprises one or more pairs of following fields:
>>: MeasObjectId 3B100 field that indicates (corresponds to) ssbFrequency of the associated measurement object.
>>: CellToAddModList field 3B110 that indicates CellToAddMod that are associated with the MeasObjectId.

Each cellIndividualOffset 3B140 comprised in CellsToAddModList 3B110 is cell individual offset for a neighboring cell indicated by:
>: the physCellId (Physical Cell Identity) 3B130 in the CellsToAddMod IE 3B120 of CellToAddModList 3B110 IE where the cellIndividualOffset 3B140 is comprised; and
>: ssbFrequency corresponding to MeasObject that is indicated by MeasObjectId 3B100 associated with the CellToAddModList 3B110 that comprises CellToAddMod where the physCellId field is comprised.

CelllListPerMOList field is optionally present, Need M, if reportType is event A3 or event A5 or event A6. Otherwise (A1, A2 or A4), it is absent, Need R.

CellIlListPerMOList field can be present in ReportConfig if reportType is event A3 or event A5 or event A6.

CelllListPerMOList field is absent in ReportConfig if reportType is event A1 or event A2 or event A4.

Figure 4:
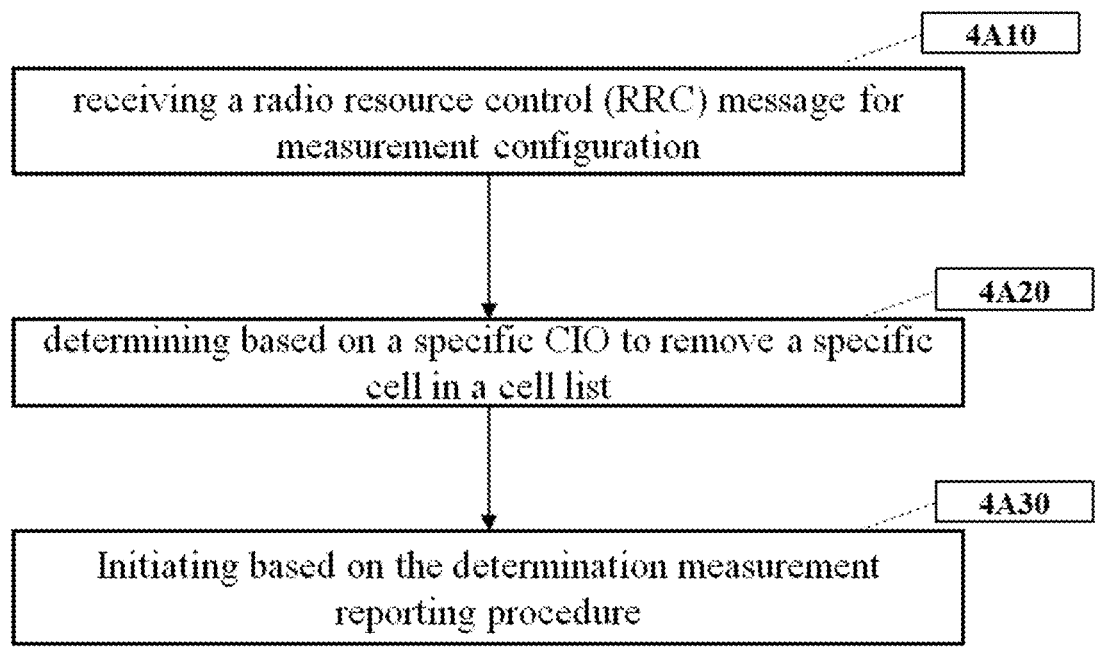
FIG. 4 is a flow diagram illustrating an operation of a terminal.

FIG. 4 is a flow diagram illustrating an operation of a terminal.

UE performs followings for measurement report.
>1: receiving by the terminal from a base station a radio resource control (RRC) message 4A10, wherein the RRC message comprises:
>>2: a measurement object configuration, wherein the measurement object configuration comprises a first information [CellsToAddModList], wherein the first information comprises one or more CIOs, and wherein each of the one or more CIOs in the first information is associated with a physical cell identity; and
>>2: a measurement report configuration, wherein the measurement report configuration comprises a second information [CellIlListPerMOList; cellIndividualOffsetList], and wherein the second information comprises one or more CIOs, and wherein each of the one or more CIOs in the second information is associated with physical cell identity and frequency of synchronization signal (SS);
>>>3: physical cell identity is determined by a first parameter 3B130 in the second information 3B90; and
>>>3: frequency of SS is determined by a second parameter 3B100 in the second information 3B90;
>1: determining, by the terminal based on a specific CIO, to remove a specific cell in a cell list [cellsTriggeredList] 4A20; and
>1: initiating, by the terminal and based on the determination, measurement reporting procedure 4A30 in case that:
>>2: a specific indication [reportOnLeave] is comprised in the measurement report configuration; and
>>2: the specific indication is set to a specific value,
>1: wherein the specific CIO is determined based on the second information in case that the specific cell is indicated in the second information and in the first information.
>1: wherein the specific CIO is determined based on the first information in case that the specific cell is not indicated in the second information and indicated in the first information.
>1: wherein the measurement object configuration and the measurement report configuration are associated by a specific measurement identity.
>1: wherein, in case that the specific CIO is determined based on the second information:
>>2: a CIO associated with a specific physical cell identity and a specific frequency of SS is the specific CIO;
>>2: the specific physical cell identity is physical cell identity of the specific cell;
>>2: the specific frequency of SS is a frequency of SS of the specific cell;
>>2: the specific physical cell identity and the specific frequency of SS are determined based on parameters in the second information.
>1: wherein, in case that the specific CIO is determined based on the first information:
>>2: a CIO associated with a specific physical cell identity is the specific CIO;
>>2: the specific physical cell identity is physical cell identity of the specific cell;
>>2: the specific physical cell identity is determined based on parameter in the first information.
>1: CIO for the specific cell in the second information is applied in case that:
>>2: CIO for the specific cell is comprised in the first information; and
>>2: CIO for the specific cell is comprised in the second information;
>1: CIO for the specific cell in the first information is applied in case that:
>>2: CIO for the specific cell is comprised in the first information; and
>>2: CIO for the specific cell is not comprised in the second information.

UE may perform followings:
>1: receiving by the terminal from a base station a radio resource control (RRC) message, wherein the RRC message comprises a measurement configuration;
>1: performing, by the terminal and based on the measurement configuration, measurement for one or more measurement identities;
>1: determining, by the terminal for a measurement identity, to initiate measurement reporting procedure; and
>1: transmitting, by the terminal to the base station, a measurement report message, >1: wherein, in case that a measurement report configuration associated with the measurement identity comprises CIO information for a one or more neighbour cells:
>>2: a first parameter related to CIO in the CIO information is applied to a specific neighbour cell;
>>2: the specific neighbour cell is determined based on:
>>>3: a second parameter related to physical cell identity; and
>>>3: a third parameter related to frequency of a specific signal; and
>>2: the first parameter and the second parameter and the third parameter are comprised in the CIO information for the one or more neighbour cell.
>1: wherein the measurement report message comprises:
>>2: the measurement identity; and
>>2: a measurement result of the neighbour cell.

The terminal determines to remove a specific cell in a cell list in case that sum of a measurement result of the specific cell and a first frequency specific offset and the specific CIO is smaller than sum of a measurement result of a special cell and a second frequency specific offset and a second CIO [Mn+Ofn+Ocn+Hys<Mp+Ofp+Ocp+Off].

The first frequency specific offset [offsetMO] is indicated in measurement object configuration associated with the specific cell.

The second frequency specific offset is indicated in measurement object configuration associated with the special cell.

The measurement result of the specific cell and the measurement result of the special cell are determined based on a parameter related to time window [timeToTrigger] in a specific report configuration.

The cellsTriggeredList is a data structure utilized in NR (New Radio) technology to maintain a list of cells that have been triggered for measurement reporting. This list is dynamically updated based on the network's configuration and the UE's (User Equipment) measurement results. When a measurement report is triggered due to a cell, information related to the cell (e.g. PCI) is included in the cellsTriggeredList. The primary purpose of the cellsTriggeredList is to ensure efficient and timely reporting of measurement data.

The reportOnLeave is a parameter used in NR (New Radio) technology to control the reporting behavior of the UE (User Equipment) when it leaves a configured measurement area. This parameter ensures that the UE sends a measurement report to the network when it detects that it is leaving the area defined by the network.

The Synchronization Signal Block (SSB) is a fundamental component in NR (New Radio) systems. The SSB consists of two main parts: the Primary Synchronization Signal (PSS) and the Secondary Synchronization Signal (SSS), along with the Physical Broadcast Channel (PBCH).
>: Primary Synchronization Signal (PSS): Helps the user equipment (UE) to achieve time and frequency synchronization with the network.
>: Secondary Synchronization Signal (SSS): Provides additional synchronization information and helps in cell ID detection.
>: Physical Broadcast Channel (PBCH): Carries essential system information required for the UE to access the network.

The SSB is transmitted periodically and is crucial for the initial access procedure, enabling the UE to detect and synchronize with the NR cell.

PSS and SSS are denoted as SS.

For measurement report triggering, UE performs followings:
>1: for each measId included in the measIdList within VarMeasConfig:
>>2: if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig:
>>>3: include a measurement reporting entry within the VarMeasReportList for this measId;
>>>3: include the concerned cell(s) in the cellsTriggeredList defined within the VarMeasReportList for this measId;
>>>3: initiate the measurement reporting procedure;
>>2: if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
>>>3: remove the concerned cell(s) in the cellsTriggeredList defined within the VarMeasReportList for this measId;
>>>3: if reportOnLeave is set to true for the corresponding reporting configuration:
>>>>4: initiate the measurement reporting procedure.

For event A3, The UE shall:
>: consider the entering condition for this event to be satisfied when condition A3-1 is fulfilled;
>: consider the leaving condition for this event to be satisfied when condition A3-2 is fulfilled.

$Mn+Ofn+Ocn-Hys>Mp+Ofp+Ocp+\text{Off}$  Inequality A3-1 (Entering condition)

$Mn+Ofn+Ocn+Hys<Mp+Ofp+Ocp+\text{Off}$  Inequality A3-2 (Leaving condition)

The variables in the formula are defined as follows:

Mn is the measurement result of the neighbouring cell, not taking into account any offsets.

Ofn is the measurement object specific offset of the reference signal of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the frequency of the neighbour cell or cellIndividualOffset as defined within ReportConfigNR), and set to zero if not configured for the neighbour cell.

Mp is the measurement result of the SpCell, not taking into account any offsets.

Ofp is the measurement object specific offset of the SpCell (i.e. offsetMO as defined within measObjectNR corresponding to the SpCell).

Ocp is the cell specific offset of the SpCell (i.e. cellIndividualOffset as defined within measObjectNR corresponding to the SpCell), and is set to zero if not configured for the SpCell.

Hys is the hysteresis parameter for this event (i.e. hysteresis as defined within reportConfigNR for this event).

Off is the offset parameter for this event (i.e. a3-Offset as defined within reportConfigNR for this event).

Mn, Mp are expressed in dBm in case of RSRP, or in dB in case of RSRQ and RS-SINR.

Ofn, Ocn, Ofp, Ocp, Hys, Off are expressed in dB.

For event A4, the UE shall:

>: consider the entering condition for this event to be satisfied when condition A4-1, as specified below, is fulfilled;

>: consider the leaving condition for this event to be satisfied when condition A4-2, as specified below, is fulfilled.

$$Mn + Ofn + Ocn - Hys > Thresh \quad \text{Inequality A4-1 (Entering condition)}$$

$$Mn + Ofn + Ocn + Hys < Thresh \quad \text{Inequality A4-2 (Leaving condition)}$$

The variables in the formula are defined as follows:

Mn is the measurement result of the neighbouring cell or the measurement result of serving PSCell (i.e., in case it is configured as candidate PSCell for CondEvent A4 evaluation) for CHO with candidate SCG(s) case, not taking into account any offsets.

Ofn is the measurement object specific offset of the neighbour cell (i.e. offsetMO as defined within measObjectNR corresponding to the neighbour cell).

Ocn is the measurement object specific offset of the neighbour cell (i.e. cellIndividualOffset as defined within measObjectNR corresponding to the neighbour cell, or cellIndividualOffset as defined within reportConfigNR), and set to zero if not configured for the neighbour cell.

Hys is the hysteresis parameter for this event (i.e. hysteresis as defined within reportConfigNR for this event).

Thresh is the threshold parameter for this event (i.e. a4-Threshold as defined within reportConfigNR for this event).

Mn is expressed in dBm in case of RSRP, or in dB in case of RSRQ and RS-SINR.

Ofn, Ocn, Hys are expressed in dB.

Thresh is expressed in the same unit as Mn.

Figure 5A:
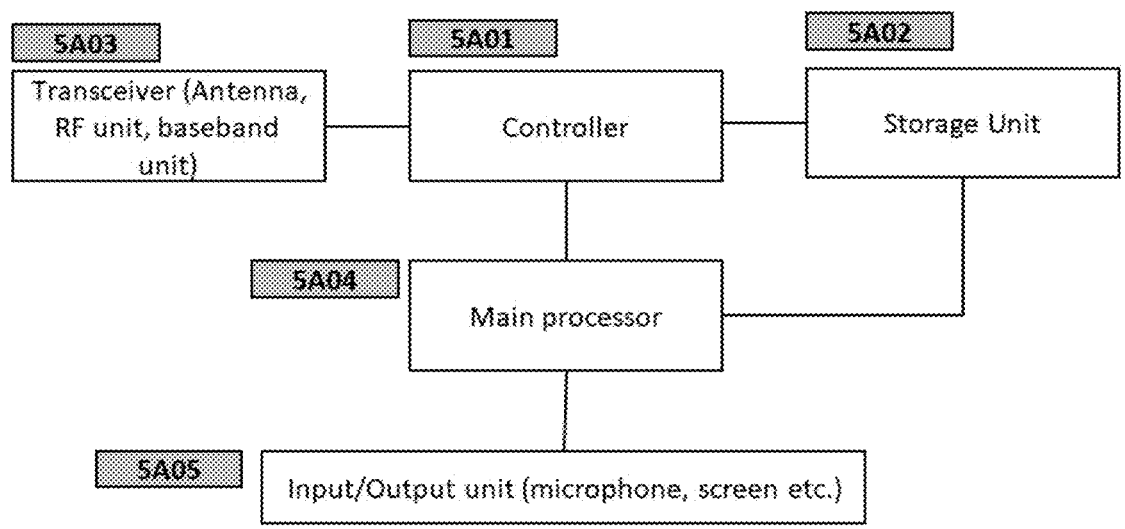
FIG. 5A is a block diagram illustrating the internal structure of a UE to which the disclosure is applied.

FIG. 5A is a block diagram illustrating the internal structure of a UE to which the disclosure is applied.

Referring to the diagram, the UE includes a controller 5A01, a storage unit 5A02, a transceiver 5A03, a main processor 5A04 and I/O unit 5A05.

The controller 5A01 controls the overall operations of the UE in terms of mobile communication. For example, the controller 5A01 receives/transmits signals through the transceiver 5A03. In addition, the controller 5A01 records and reads data in the storage unit 5A02. To this end, the controller 5A01 includes at least one processor. For example, the controller 5A01 may include a communication processor (CP) that performs control for communication and an application processor (AP) that controls the upper layer, such as an application program. The controller controls storage unit and transceiver such that UE operations in the present disclosure are performed.

The storage unit 5A02 stores data for operation of the UE, such as a basic program, an application program, and configuration information. The storage unit 5A02 provides stored data at a request of the controller 5A01.

The transceiver 5A03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 5A04 controls the overall operations other than mobile operation. The main processor 5A04 process user input received from I/O unit 5A05, stores data in the storage unit 5A02, controls the controller 5A01 for required mobile communication operations and forward user data to I/O unit 5A05.

I/O unit 5A05 consists of equipment for inputting user data and for outputting user data such as a microphone and a screen. I/O unit 5A05 performs inputting and outputting user data based on the main processor's instruction.

Figure 5B:
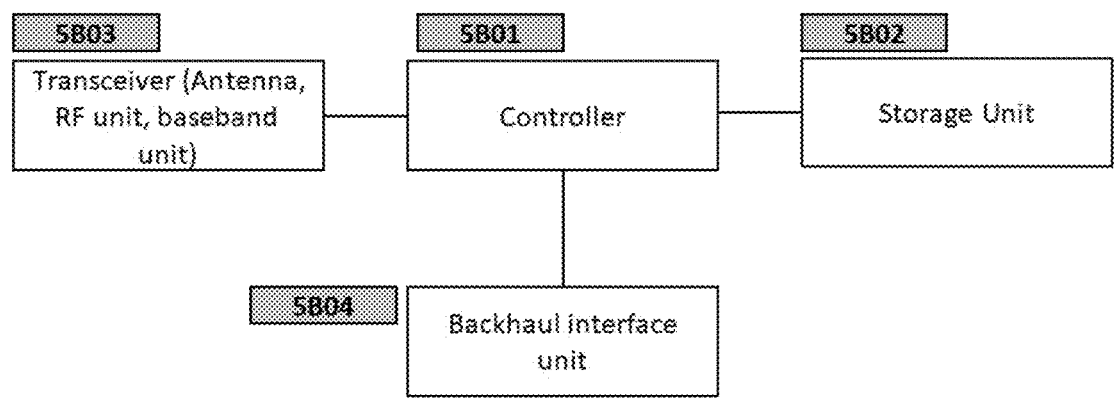
FIG. 5B is a block diagram illustrating the configuration of a base station according to the disclosure.

FIG. 5B is a block diagram illustrating the configuration of a base station according to the disclosure.

As illustrated in the diagram, the base station includes a controller 5B01, a storage unit 5B02, a transceiver 5B03 and a backhaul interface unit 5B04.

The controller 5B01 controls the overall operations of the main base station. For example, the controller 5B01 receives/transmits signals through the transceiver 5B03, or through the backhaul interface unit 5B04. In addition, the controller 5B01 records and reads data in the storage unit 5B02. To this end, the controller 5B01 may include at least one processor. The controller controls transceiver, storage unit and backhaul interface such that base station operation in the present disclosure.

The storage unit 5B02 stores data for operation of the main base station, such as a basic program, an application program, and configuration information. Particularly, the storage unit 5B02 may store information regarding a bearer allocated to an accessed UE, a measurement result reported from the accessed UE, and the like. In addition, the storage unit 5B02 may store information serving as a criterion to determine whether to provide the UE with multi-connection or to discontinue the same. In addition, the storage unit 5B02 provides stored data at a request of the controller 5B01.

The transceiver 5B03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 5B04 provides an interface for communicating with other nodes inside the network. The backhaul interface unit 5B04 converts a bit string transmitted from the base station to another node, for example, another base station or a core network, into a physical signal, and converts a physical signal received from the other node into a bit string.

What is claimed is:

1. A method performed by a terminal, the method comprising:
   receiving by the terminal from a base station a radio resource control (RRC) message, wherein the RRC message comprises:
      one or more measurement object configuration parameters, and
      one or more measurement report configuration parameters;
   determining, by the terminal based on a specific Cell Individual Offset (CIO), to remove a specific cell in a cell list with a measurement identity; and
   initiating, by the terminal based on the determination, measurement reporting procedure for the measurement identity,
   wherein:
      each of the one or more measurement object configuration parameters comprises one or more first parameters related to CIO; and
      each of the one or more first parameters comprises a parameter for physical cell identity and a parameter for CIO,
   wherein:
      each of the one or more measurement report configuration parameters is either first type measurement report configuration parameter or second type measurement report configuration parameter;
      the first type measurement report configuration parameter comprises a parameter that is set to one of a first set of events;
      the second type measurement report configuration parameter comprises a parameter that is set to one of a second set of events;
      the first set of events comprises event A3, event A5 and event A6; and
      the second set of events comprises event A1 and event A2,
   wherein:
      the first type measurement report configuration parameter further comprises one or more second parameters related to CIO; and
      each of the one or more second parameters comprises the parameter for physical cell identity, the parameter for CIO and a parameter for frequency of synchronization signal (SS),
   wherein:
      the specific CIO is determined from the parameter for CIO in a specific second parameter in a specific first type measurement report configuration parameter; and
      the specific first type measurement report configuration parameter is associated with the measurement identity, and
   wherein the specific second parameter comprises:
      the parameter for physical cell identity that indicates a physical cell identity of the specific cell; and
      the parameter for frequency of SS indicates a frequency of SS of the specific cell to which the specific CIO is applied.

2. The method of claim 1, wherein:
   the terminal determines to remove the specific cell in the cell list based on a comparison between:
      a sum of a measurement result of the specific cell, a first frequency specific offset, and the specific CIO; and
      a sum of a measurement result of a special cell, a second frequency specific offset, and a second CIO.

3. The method of claim 2, wherein:
   the first frequency specific offset is indicated in the measurement object configuration parameter associated with the specific cell; and
   the second frequency specific offset is indicated in the measurement object configuration parameter associated with the special cell.

4. The method of claim 1,
   wherein the specific CIO is determined further from the parameter for CIO in a specific first parameter in a specific measurement object configuration parameter in case that second type measurement report configuration parameter is associated with the measurement identity.

5. The method of claim 4,
   wherein the specific measurement object configuration parameter is associated with the measurement identity.

6. The method of claim 5,
   wherein the specific first parameter comprises the parameter for physical cell identity that indicates the physical cell identity of the special cell.

7. A terminal comprising:
   a transceiver,
   a memory, and
   a controller coupled to the transceiver and the memory, wherein the controller is configured to cause the terminal to:
   receive from a base station a radio resource control (RRC) message, wherein the RRC message comprises:
      one or more measurement object configuration parameters, and
      one or more measurement report configuration parameters;
   determine, based on a specific Cell Individual Offset (CIO), to remove a specific cell in a cell list with a measurement identity; and
   initiate, based on the determination, measurement reporting procedure for the measurement identity,
   wherein:
      each of the one or more measurement object configuration parameters comprises one or more first parameters related to CIO; and
      each of the one or more first parameters comprises a parameter for physical cell identity and a parameter for CIO,
   wherein:
      each of the one or more measurement report configuration parameters is either first type measurement report configuration parameter or second type measurement report configuration parameter;
      the first type measurement report configuration parameter comprises a parameter that is set to one of a first set of events;
      the second type measurement report configuration parameter comprises a parameter that is set to one of a second set of events;
      the first set of events comprises event A3, event A5 and event A6; and the second set of events comprises event A1 and event A2, wherein:
the first type measurement report configuration parameter further comprises one or more second parameters related to CIO; and
each of the one or more second parameters comprises the parameter for physical cell identity, the parameter for CIO and a parameter for frequency of synchronization signal (SS), wherein:
the specific CIO is determined from the parameter for CIO in a specific second parameter in a specific first type measurement report configuration parameter; and
the specific first type measurement report configuration parameter is associated with the measurement identity, and wherein the specific second parameter comprises:
the parameter for physical cell identity that indicates a physical cell identity of the specific cell; and
the parameter for frequency of SS indicates a frequency of SS of the specific cell to which the specific CIO is applied.

* * * * *